United States Patent [19]
Allen et al.

[11] Patent Number: 5,555,401
[45] Date of Patent: Sep. 10, 1996

[54] SELF CONFIGURING DEVICE SYSTEM

[75] Inventors: Tom Allen, Marlborough; Joseph E. Provino, Cambridge; William F. Pittore, Lexington, all of Mass.; Steven Kleiman, Los Altos, Calif.

[73] Assignee: Sun Microsystems, Inc., Mountain View, Calif.

[21] Appl. No.: 561,558

[22] Filed: Nov. 22, 1995

Related U.S. Application Data

[63] Continuation of Ser. No. 361,893, Dec. 22, 1994, abandoned, which is a continuation of Ser. No. 936,239, Aug. 26, 1992, abandoned.

[51] Int. Cl.$^6$ ..................................................... G06F 13/10
[52] U.S. Cl. ................. 395/500; 364/232.2; 364/237.9; 364/239.9; 364/280; 364/280.2; 364/DIG. 1
[58] Field of Search ..................................... 395/500, 700

[56] References Cited

U.S. PATENT DOCUMENTS

| | | | |
|---|---|---|---|
| 4,649,479 | 3/1987 | Advani et al. | 395/700 |
| 4,701,848 | 10/1987 | Clyde | 395/325 |
| 4,974,151 | 11/1990 | Advani et al. | 395/700 |
| 5,265,252 | 11/1993 | Rawson, III et al. | 395/700 |
| 5,307,491 | 4/1994 | Feriozi et al. | 395/700 |

OTHER PUBLICATIONS

Locus Operating System, a Transparent System, Greg Thiel, Computer Communications, vol. 14, No. 6, pp. 336–346 XP219166, p. 340, left column, line 28–right column, line 16, Jul. 1991.

Small Computer System Interface Linear Mapping Mechanism, IBM Technical Disclosure Bulletin, vol. 34, No. 10B, Mar. 1992, New York US, pp. 349–350 XP302757 (the entire document).

Virtual Configurations, Brian Clark, et al., Systems International, vol. 16, No. 7, Jul. 1988, pp. 49–50 (the entire document).

Primary Examiner—Kevin J. Teska
Assistant Examiner—Ayni Mohamed
Attorney, Agent, or Firm—Erwin J. Basinski

[57] ABSTRACT

A method and apparatus for automatically generating device names in a computer system, wherein device names are generated to reflect the physical realities of system configuration. An existing device driver interface is employed, wherein a parent device driver's bus_ctl function, along with a child device driver's probe and attach routines, are used to generate device names. The hierarchical relationship between parent and child devices are determined by analyzing device information contained within a hardware configuration file and a classes file

24 Claims, 7 Drawing Sheets

SELF CONFIGURING DEVICE SYSTEM

This is a continuation of application Ser. No. 08/361,893, filed Dec. 22, 1994, now abandoned, which is a continuation of application Ser. No. 07/936,239, filed Aug. 26, 1992, now abandoned.

BACKGROUND OF THE INVENTION

1. Field of the Invention

The present invention relates to the field of computer systems and their operating systems. More specifically, the present invention relates to device naming in computer systems executing the UNIX® system (UNIX is a registered trademark in the United States and in other countries and is exclusively licensed by X/OPEN Company Ltd.

2. Art Background

In a computer system executing the UNIX® operating system, devices are represented as special files within a file system. Each device represented in the file system is described by a data structure called an inode. Devices within the file system represent physical devices. Logical device names are symbolic links to the physical device names.

Previously, the necessary files were created at device driver installation time. Typically, an installation script was provided along with a device driver installation package. The installation script invoked the MKNOD command to create special files, and to generate device names for the new devices.

Unfortunately, installation scripts create device names that poorly reflect the realities of system configuration. For example, a user may optionally divide a disc unit into multiple logical units at device driver installation time. However, the author of the installation script cannot foresee the arrangement of logical units selected by a user. As a result, the installation script must invoke the MKNOD command to create device names reflecting all possible logical devices. Consequently, the file system can become cluttered with unnecessary special files.

Moreover, the device names created by an installation script do not necessarily reflect the physical arrangement of devices in the system. The author of the installation script has no knowledge of the physical arrangement of devices. As a result, the device names generated by the installation script are independent of physical arrangement.

As will be disclosed, the present invention provides a method and apparatus for automatically generating device names in a computer system, wherein only devices actually installed in the system are named. Moreover, the device names created reflect the actual physical arrangement of physical devices in the system.

For further description of the UNIX® system including the device file system, see M. J. Bach, *The Design of the UNIX® Operating System*, Prentice Hall, 1986.

SUMMARY OF THE INVENTION

A method and apparatus for automatically generating device names in a computer system is disclosed, wherein device names are generated to reflect the physical realities of system configuration. An existing device driver interface is employed, wherein a parent device driver's bus_ctl function, along with a child device driver's probe and attach routines, are used to generate device names. The hierarchical relationship between parent and child devices are determined by analyzing device information contained within a hardware configuration file and a classes file.

For a device driver, a hardware configuration file is maintained which contains a device information entry for each device supported by the device driver. An entry in the hardware configuration file specifies either a parent device or a class of devices. If the entry specifies a parent device, then a prototype dev info node is created with a device name initialized to the driver name. If the entry specifies a class of devices, then for each possible parent specified in a classes file, a prototype dev info node is created with a device name initialized to the driver name.

Thereafter, a parent device driver corresponding to a possible parent device is loaded, and a bus control operation of the parent device driver is invoked. The bus control operation causes the parent device driver to sense a connection to the child device specified in the prototype dev info node, and to generate a device name for the child device. If the parent device driver fails to sense the child device, the prototype dev info node is deleted.

A child device driver is then loaded, and probe and attach routines of the child device driver are invoked. The attach routine causes the child device driver to sense leaf devices coupled to the child device, and to generate minor node data for each leaf device. If the probe and attach operation fails, then the prototype dev info nodes are deleted.

DETAILED DESCRIPTION OF THE INVENTION

A method and apparatus for automatically generating device names in a computer system is disclosed, wherein the device names generated reflect the physical realities of system configuration. The present invention has particular applications in computer systems employing the UNIX® operating system. In the following description, for purposes of explanation, specific data, data structures, and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 1:
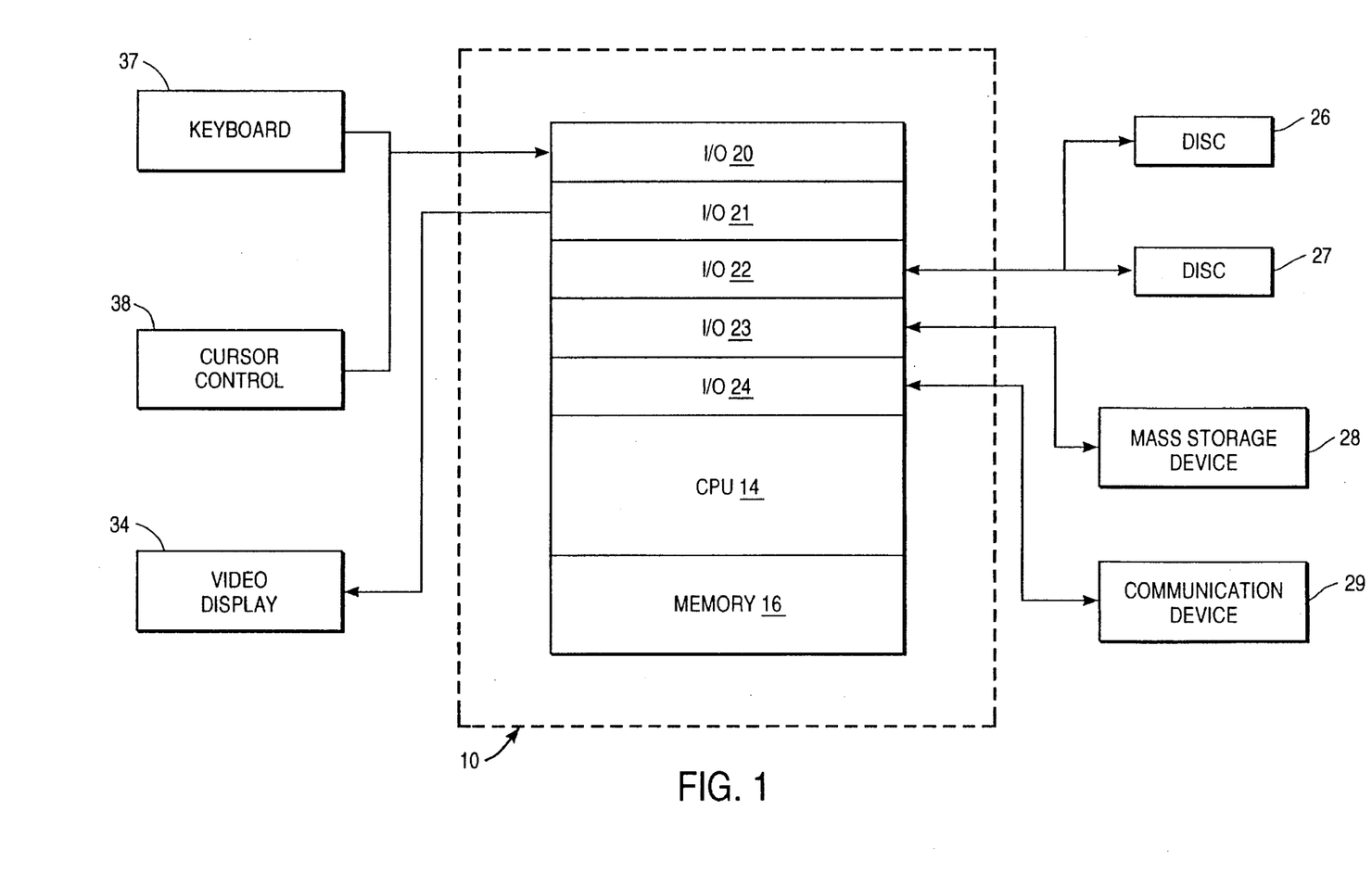
FIG. 1 illustrates the hardware elements of an example computer system employing the teachings of the present invention.

Referring to FIG. 1, an example computer system incorporating the teachings of the present invention is illustrated. Computer 10 is comprised of three major components: Input/output (I/O) circuits 20–24, central processing unit (CPU) 14, and memory 16. I/O circuits 20–24 are used to transfer information in appropriately structured form to and from other portions of computer 10. I/O circuits, such as I/O circuits 20–24, along with CPU 14 and memory 16, are typically found in most general purpose computer systems.

Disc units 26 and 27 are coupled to I/O circuit 22 to provide additional storage capability for computer 10. Disc units 26 and 27 may optionally be divided in to multiple logical disc units for purposes of device identification. As is well known, disc units 26 and 27 may store other computer programs, characters, routines, etc., which may be accessed and executed by CPU 14.

Mass storage device 28 is coupled to I/O circuit 23, and communication device 29 is coupled to I/O circuit 24. It will be appreciated that a wide variety of well known devices may be coupled to the computer 10, devices such as magnetic tape drives, as well as networks, which are in turn may be coupled to other computer systems.

A raster display monitor 34 is coupled to I/O circuit 21, and is used to display images generated by CPU 14 in accordance with the teachings of the present invention. Any well known variety of raster displays may be utilized as display 34. A keyboard 37 is shown coupled to I/O circuit 20 and is used to input data and commands into computer 10, as is well known. A cursor control device 38 is also shown coupled to computer 10 through I/O circuit 20. Any well known variety of cursor control devices may be utilized as cursor control device 38.

In fact, the several hardware elements illustrated are intended to represent a broad category of computer systems. Particular examples include computer systems manufactured by Sun Microsystems, Inc. of Mountain View, Calif. Other computer systems having like capabilities may of course be adapted in a straightforward manner to perform the functions described below.

The present method takes advantage of an existing device driver interface to automatically generate device names reflecting a hierarchical arrangement of physical devices. Specifically, a parent device driver's bus_ctl function, along with a child device driver's probe and attach routines are employed in a coordinated effort to generate device names that reflect the physical configuration of the system. The hierarchical relationship between parent and child devices is determined by analyzing device information contained within a hardware configuration file and a classes file.

For further discussion of example probe and attach routines that are consistent with the teachings of the present invention, refer to SUN OS 5.0 *Writing Device Drivers*, Part#800-65020-10, Sun Microsystems, Inc. of Mountain View, Calif.

Figure 2:
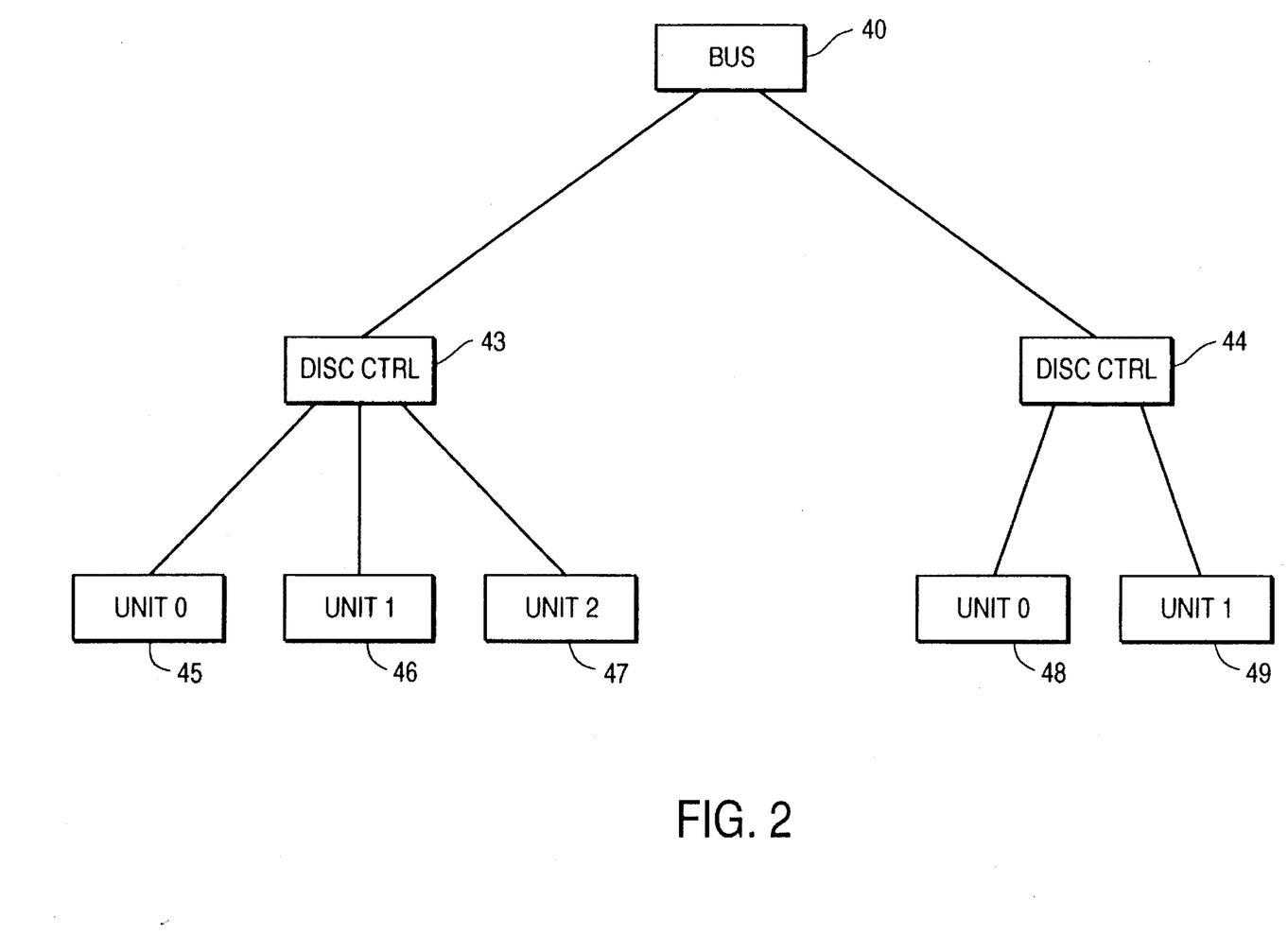
FIG. 2 illustrates an example hierarchical arrangement of physical devices in a computer system, including logical disc units coupled to disc controllers.

Referring to FIG. 2, a hierarchical structure of devices coupled to a portion of computer system 10 is illustrated. Block 40 represents a physical bus coupled to computer system 10. Block 40 is intended to represent a wide variety of well known bus standards for communication among elements of a computer system.

Blocks 43 and 44 represent disc controllers physically coupled to the bus represented by block 40. Disc controller 43 is physically coupled to disc units 0–3, which are represented by blocks 45–47. Similarly, disc controller 44 is physically coupled to disc units 0 and 1, represented by blocks 48 and 49. The disc units represented by blocks 45–49 may be physical devices, or may be logical subdivisions within a physical device.

Each disc controller 43 and 44 has a corresponding device driver that support disc units 45–47, and 48–49 respectively. The present method provides each device driver with an associated hardware configuration file. The name of the hardware configuration file for a particular device driver is the same as the device driver name, along with a suffix of ".conf". For example, if driver2 is the device driver for disc controller 43, then the name of the hardware configuration file for driver2 is "driver2.conf". The driver2.conf file contains device information for each disc unit 45–47.

Figure 3A:
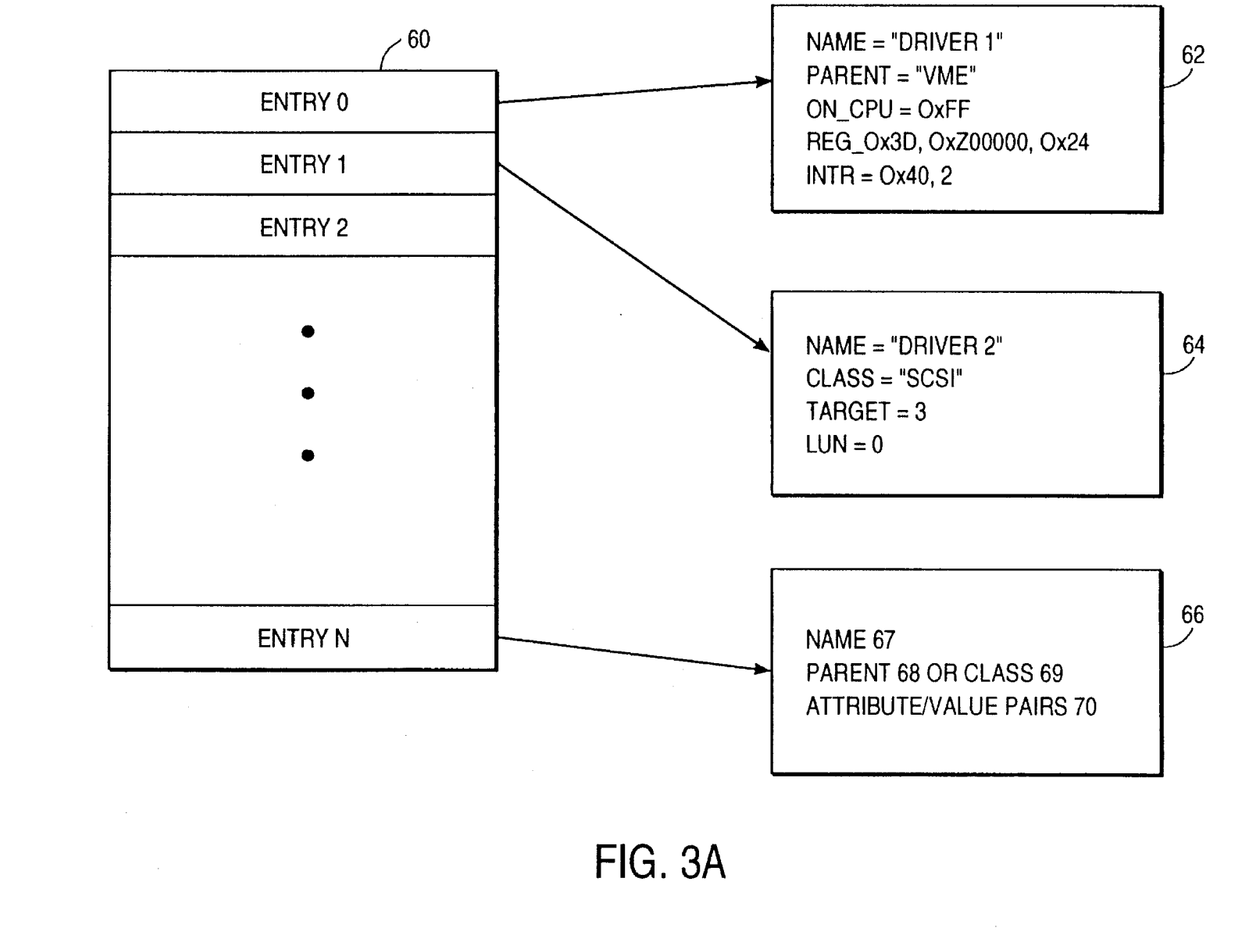
FIG. 3a–3b illustrate the elements of an example hardware configuration file, and an example classes file.

Referring to FIG. 3a, an illustration of a hardware configuration file 60 is shown. Block 66 provides an expanded view of a generic entry "n" of the hardware configuration file 60. Each entry 66 provides device information for a physical or logical device supported by the corresponding device driver. An entry 66 contains a name 67, a parent 68 or class 69, and a set of attribute/value pairs 70 which provide device specific data. The type of information stored in attribute/value pairs 70 is determined by the requirements of the particular device driver for the entry 66.

Block 62 illustrates an example entry in the hardware configuration file 60. In entry 62, the name 67 is set to "driver 1" and the parent name 68 is "VME". The VME type device specific data includes an On_CPU value, a REG value, and an INTR value.

Block 64 provides another example entry in a hardware configuration file 60. In entry 64, the name 67 is set to "driver2" which is the name of the corresponding device driver. The class 69 is "SCSI" and the device specific data includes an SCSI target value (Target=3), and an SCSI logical unit number (LUN=0) value.

Figure 3B:
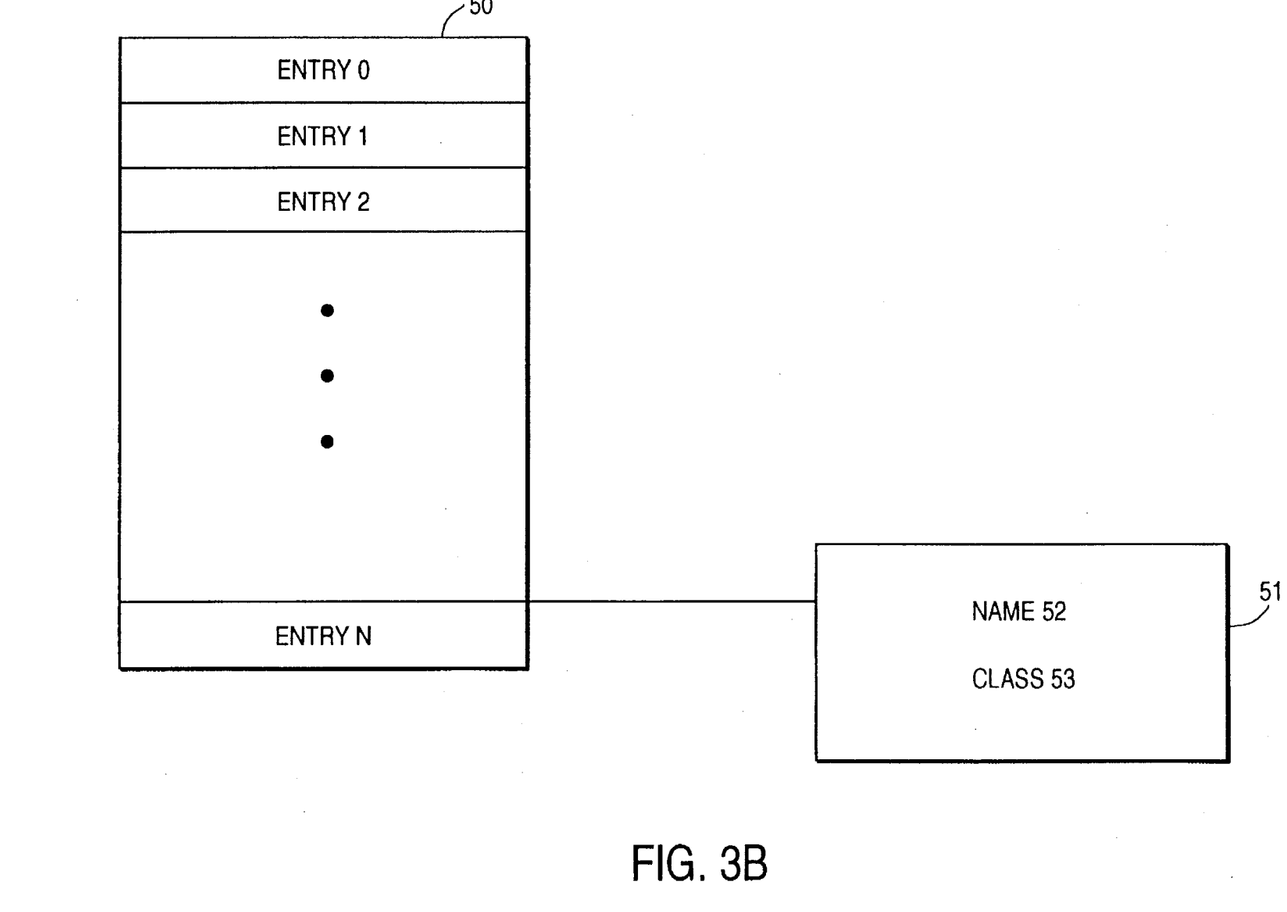

FIG. 3b illustrates an example classes file 50. A class entry 51 specifies a device driver 52, and an associated class 53. In this context, a class is a group of devices which connect together to a common bus. For example, a group of devices coupled an SCSI bus can define a class. In the current embodiment, nexus drivers that control a class have an entry in a classes file.

Figure 4A:
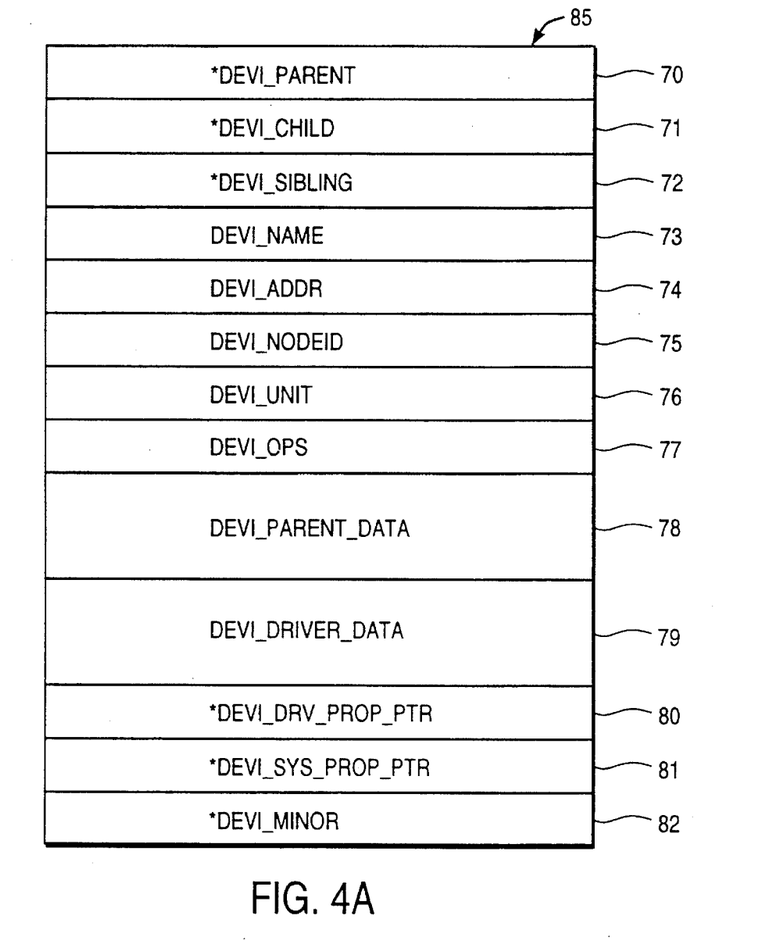
FIGS. 4a–4b illustrate the elements of DEV_INFO_NODE and DDI_MINOR_DATA device information data structures.

FIG. 4a illustrates an example DEV_INFO_NODE 85, which is a device information data structure. As will be seen, an aggregate of DEV_INFO_NODE data structures defines a dev info tree that reflects the physical relationship between devices. A given DEV_INFO_NODE 85 describes a set of one or more devices having a common device driver. A DEV_INFO_NODE 85 may represent a physical device, such as a disc or tape controller, or may represent a collection of logical devices. For example, the disc units 45–47 coupled to disc controller 43 have a corresponding DEV_INFO_NODE 85 in a dev info tree.

Entry 70 of DEV_INFO_NODE 85 is a pointer to a corresponding parent DEV_INFO_NODE. Entry 71 is a pointer to a corresponding child DEV_INFO_NODE. Entry 72 is a pointer to a DEV_INFO_NODE for the next element on the same level in a dev info tree. Entry 73 holds the device name, and entry 74 holds an address part of the device name. Entry 75 contains the device's node id, while entry 76 contains the device's unit number. Entry 77 provides a pointer to a driver operations data structure. Entries 78 and 79 provide parent private data and driver private data, respectively. Entry 80 provides a pointer to a driver property list, and entry 81 provides a pointer to the system property list. Finally, entry 82 provides a pointer to the minor data structures (DDI_MINOR_DATA) that define one or more leaf devices associated with DEV_INFO_NODE 85.

Figure 4B:
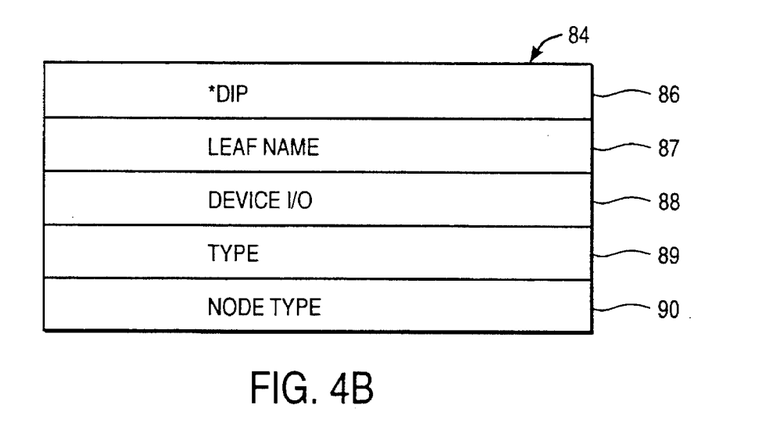

FIG. 4b illustrates the format of a DDI_MINOR_DATA 84 data structure. A given DDI_MINOR_DATA 84 describes a "leaf" device for a corresponding DEV_INFO_NODE 85 data structure. Entry 86 is a pointer to the corresponding DEV_INFO_NODE 85. Entry 87 is a leaf name, entry 88 is the leaf device id, entry 89 specifies block or char type for the device, and entry 90 specifies block, byte, serial, or network node type.

Figure 5:
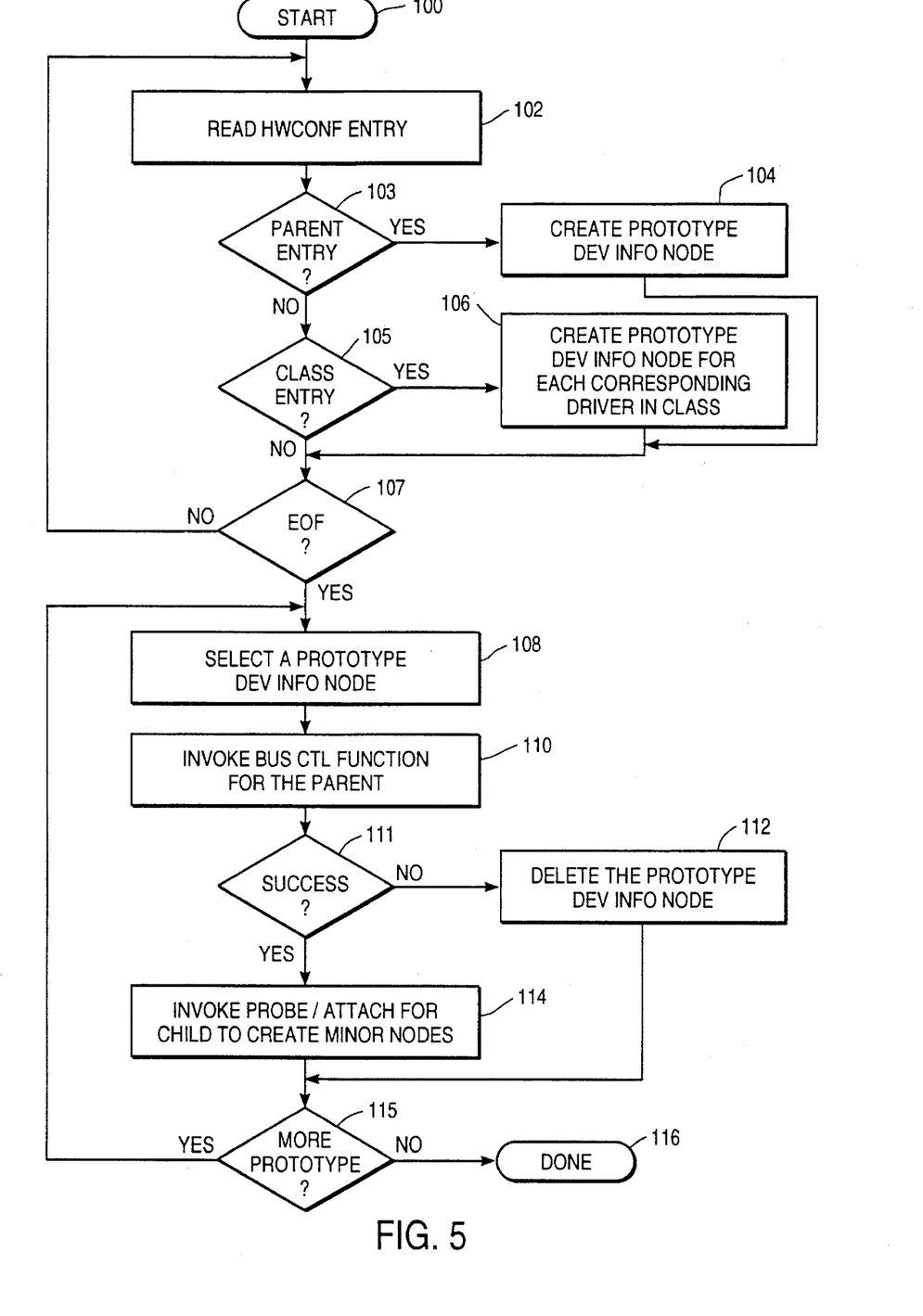
FIG. 5 shows the operational flow of the method employed by the current embodiment of the present invention to generate device names that reflect physical realities of the system.

FIG. 5, provides an operational flow diagram illustrating the present method for automatically generating DEV_INFO_NODE 85 and DDI_MINOR_DATA 84 data structures. In the current embodiment, the present method is employed during system installation or when a new device driver is added to the system. A "drvconfig" routine is invoked which takes as parameters a device driver name and major number.

At block 102, an entry 66 is read from the hardware configuration file 60 corresponding to the device driver specified in the drvconfig call. If the entry 66 specifies a parent 68, then control proceeds to block 104, where a prototype DEV_INFO_NODE 85 is created. Entry 73 of the prototype DEV_INFO_NODE 85 is initialized to the name 67 of the hardware configuration file entry 66. Control then proceeds to decision block 107 where an end of file for the hardware configuration file 60 is checked.

If the hardware configuration file entry 66 does not have a parent 68 specified, then control proceeds to decision block 105, where a class 69 specification is tested. If a class 69 specified in hardware configuration file entry 66 has a matching entry 51 in the classes file 50, then control proceeds to block 106. Otherwise, an end of file for the hardware configuration file 60 is checked as discussed above.

At block 106, a prototype DEV_INFO_NODE 85 is created for each entry 51 in the classes file 50 having a class 53 equal to class 69. For each prototype DEV_INFO_NODE 85, entry 73 is initialized to the device driver 52 of the class file entry 51. Control then proceeds to decision block 107, where an end of file for the hardware configuration file 60 is checked as discussed above.

If end of file is reached for the hardware configuration file 60 at decision block 107, then control then proceeds to block 108. At this point, a set of prototype DEV_INFO_NODE 85 data structures have been created, with their DEVI_NAME 73 initialized to either name 67 of the corresponding hardware configuration file 60 entry, or device driver 52 of the corresponding classes file 50 entry.

At block 108, one of the prototype DEV_INFO_NODE 85 data structures is selected. At control block 110, a parent driver corresponding to the selected prototype DEV_INFO_NODE 85 is loaded, and a bus_ctl function for the parent driver is invoked. The parent driver is specified by the DEVI_NAME 73 of the prototype DEV_INFO_NODE 85.

The DEVI_OPS 77 field of the DEV_INFO_NODE 85 corresponding to the parent driver is a pointer to a dev_ops structure for the parent driver. The last entry in the dev_ops structure is a pointer to a dev_bus_ops structure for the parent driver. The dev_bus_ops structure defines parent device driver entry points required for nexus drivers. One of the parent driver entry points in the dev_bus_ops structure corresponding to the parent device driver is the bus_ctl function. If the dev_bus_ops structure corresponding to the parent DEV_INFO_NODE 85 is null, then the corresponding parent device driver is not a nexus driver.

A bus_ctl function is invoked by calling a ddi_initchild routine, which takes as parameters a pointer to the DEV_INFO_NODE 85 corresponding to the parent driver, and a pointer to the DEV_INFO_NODE 85 corresponding to the prototype. The ddi_initchild routine invokes the bus_ctl function with a DDI_CTLOPS_INITCHILD operation. In the current embodiment of the present invention, all nexus drivers must support the DDI_CTLOPS_INITCHILD operation, and must therefore have a bus_ctl function in their dev_bus_ops structure.

The BUS_CTL operation of the parent driver senses a child device defined by the prototype DEV_INFO_NODE 85. If the child device is sensed, an address portion of the child device name DEVI_ADDR 74 is generated. DEVI_ADDR 74 is generated according to the needs of parent device driver. However, the address part of the device name DEVI_ADDR 74 should uniquely identify the child device.

For example, in the case of an SCSI device the BUS_CTL operation of the parent driver may interrogate a child devices LUN or target, and if successful generate DEVI_ADDR 74 equal to a combination of the target and LUN values. Thus, if the DEVI_NAME 73 was initialized to the name 67 equal to "DRIVER2" as given in entry 64 of the hardware configuration file 60, the parent device driver may generate DEVI_ADDR 74 equal to "3,0". In the current embodiment, the resulting device name is represented as "DRIVER2@3,0".

If the bus_ctl function does not return DDI_SUCCESS, then control proceeds to block 112 where the prototype DEV_INFO_NODE 85 is deleted. Thereafter, control proceeds to decision block 115, in order to process a next prototype DEV_INFO_NODE 85.

If the bus_ctl function of the parent driver returns DDI_SUCCESS, then control proceeds to block 114. At block 114, the probe and attach routines for the child device driver are invoked to create DDI_MINOR_DATA 84 data structures for leaf devices. The attach routine of the child device driver senses leaf devices, and creates corresponding DDI_MINOR_DATA 84 data structures for the leaf nodes by calling the ddi_create_minor_node routine.

The leaf name 73 for each DDI_MINOR_DATA 84 is generated by the child device driver according to child device driver requirements. For example, if the child device driver "DRIVER2" corresponds to disc controller 43, the leaf nodes may be sensed by reading the label of any attached disc units 45–47.

Figure 6:
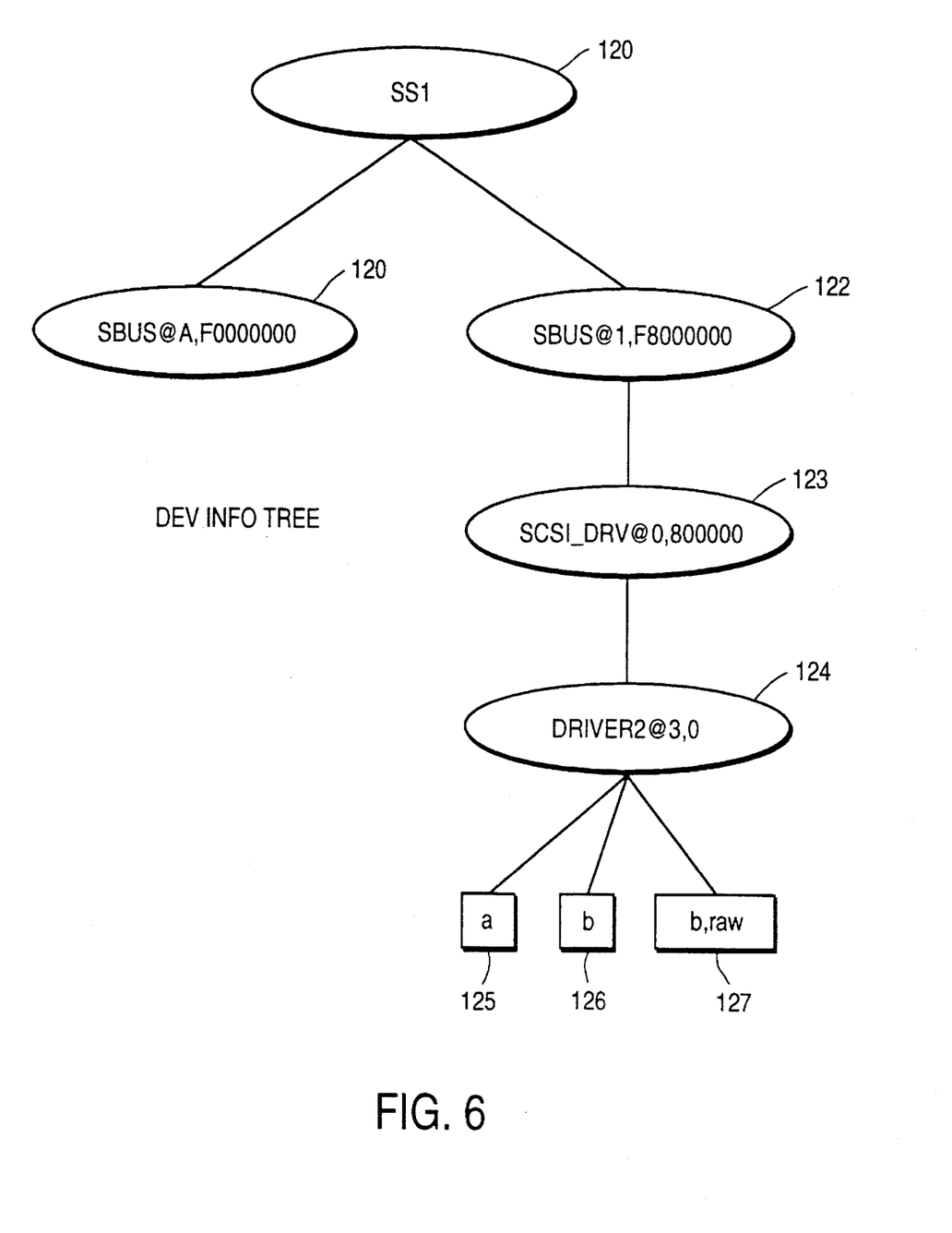
FIG. 6 illustrates an example dev info tree, which is defined by a set of DEV_INFO_NODE and DDI_MINOR_DATA device information data structures generated by the present method.

Referring to FIG. 6, an example dev info tree created by the present method is illustrated. Node 120 represents a common bus to which lower level devices are coupled. Nodes 120 and 122 represent particular address ranges of bus 120. Node 123 represents an SCSI controller for computer system 10. Node 124 corresponds to the DEV_INFO_NODE 85 data structure for the disc controller 43. Leaf nodes 125–127 correspond to DDI_MINOR_DATA 84 data structures created by child device driver "DRIVER2." Leaf names "a" "b" and "b,raw" were generated the DRIVER2 attach routine through ddi_create_minor_node.

While the present invention has been described in terms of a current embodiment, those skilled in the art will recognize that the invention is not limited to the embodiment described. The method and apparatus of the present invention can be practiced with modification and alteration within the spirit and scope of the appended claims. The description is thus to be regarded as illustrative instead of restrictive on the present invention.

What is claimed is:

1. A computer implemented method for generating device names accessible by a user, the device names indicating a physical arrangement of devices in a computer system, comprising the steps of:

(a) determining a hierarchy of the devices according to the physical arrangement of the devices in the computer system, and determining a device driver for each device in the hierarchy;

(b) generating a device name for each device in the hierarchy;

(c) for each device in the hierarchy that is a non-leaf device, creating at least one non-leaf node in the hierarchy, said non-leaf node being accessible by the user, said non-leaf node containing a pointer to a non-leaf node of a parent of the non-leaf device;

(d) for each leaf device in the hierarchy, creating at least one device inode that is accessible by the user, said device inode containing a pointer to a non-leaf node of a parent of the leaf device; and (e) for each device in the hierarchy, executing the device driver to generate minor node data and leaf device names, and if the minor node data specifies additional minor nodes, creating an additional inode accessible by the user for each additional minor node, the additional inodes having the leaf device names.

2. The method of claim 1, wherein step (a) comprises the step of accessing a hardware configuration file for the device driver, the hardware configuration file having at least one config entry, each config entry defining a possible child device location and at least one possible parent device.

3. The method of claim 1, wherein step (a) further comprises the step of executing each device driver in the environment provided by the parent of the device driver.

4. The method of claim 2, wherein for each config entry, the step of accessing a hardware configuration file for the device driver comprises the steps of:

(a) if the config entry specifies a parent name, searching a dev info tree for a parent dev info node corresponding to the parent name;

(b) if the parent device dev info node is found in the device info tree, creating the prototype dev info node, and setting a prototype name field of the prototype dev info node equal to a name field of the config entry.

5. The method of claim 2, wherein for each config entry, the step of accessing a hardware configuration file for the device driver comprises the steps of:

(a) if the config entry specifies a class name, searching a class file for at least one class entry corresponding to the class name;

(b) for each class entry corresponding to the class name, searching a dev info tree for a parent dev info node corresponding to the class entry;

(c) for each class entry corresponding to the class name, if the parent dev info node is found in the dev info tree, creating the prototype dev info node, and setting a prototype name field of the prototype dev info node equal to a name field of the config entry.

6. The method of claim 5, wherein each class entry in the class file comprises a driver name portion, and a device class portion.

7. The method of claim 6, wherein for each class entry, step (b) comprises the step of searching the dev info tree for a parent dev info node corresponding to the driver name portion of the class entry.

8. The method of claim 2, wherein the step of generating the device names comprises the steps of:

(a) for each prototype dev info node, generating a device name for the child device using a parent device driver for the possible parent device;

(b) for each prototype dev info node, generating leaf nodes for the child device using a child device driver for the child device.

9. The method of claim 8, wherein for each prototype dev info node, step (a) comprises the steps of:

(a) loading the parent device driver corresponding to the possible parent device;

(b) invoking a bus control operation of the parent device driver, the bus control operation causing the parent device driver to generate a device name for the child device;

(c) if the parent device driver signals failure to generate a device name, then deleting the prototype dev info node.

10. The method of claim 8, wherein for each prototype dev info node, step (b) comprises the steps of:

(a) loading the child device driver corresponding to the child device;

(b) invoking a probe and attach operation of the child device driver, the probe and attach operation causing the child device driver to sense at least one leaf device coupled to the child device, and to generate a minor data node for each leaf device;

(c) if the child device driver probe and attach operation fails, then deleting the prototype dev info node;

(d) creating a special inode for each leaf device.

11. The method of claim 1, wherein step (a) comprises the steps of:

(a) creating a dev info node for a root node of the hierarchy using the corresponding root node device driver;

(b) determining child nodes of the root node using the root node device driver;

(c) creating a dev info node for each child node;

(d) determining a device driver corresponding to each child node according to a name of the child node;

(e) repeating steps (b) through (d) to determine the hierarchy.

12. An apparatus for generating device names accessible by a user, the device names indicating a physical arrangement of devices in a computer system, comprising:

means for determining a hierarchy of the devices according to the physical arrangement of the devices in the computer system, and determining a device driver for each device in the hierarchy;

means for generating a device name for each device in the hierarchy;

means for creating at least one non-leaf node in the hierarchy for each device in the hierarchy that is a non-leaf device, said non-leaf node being accessible by a user, said non-leaf node containing a pointer to a non-leaf node of a parent of the non-leaf device;

means for creating at least one device inode for each leaf device in the hierarchy, said device inode being accessible by the user, said device inode containing a pointer to a non-leaf node of the parent of the leaf device;

means for each device in the hierarchy, to execute the device driver to generate minor node data and leaf device names; and means for creating an additional inode accessible by the user for each additional minor node if the minor node data specifies additional minor nodes, the additional inodes having the leaf device names.

13. The apparatus of claim 12, wherein the means for determining a hierarchy of the devices comprises means for accessing a hardware configuration file for the device driver, the hardware configuration file having at least one config entry, each config entry defining a possible child device location and at least one possible parent device.

14. The apparatus of claim 12, wherein the means for determining a hierarchy of the devices further comprises means for executing each device driver in the environment provided by the parent of the device driver.

15. The apparatus of claim 13, wherein the means for accessing a hardware configuration file for the device driver comprises:

means for searching a dev info tree for a parent dev info node corresponding to the parent name, if the config entry specifies a parent name;

means for creating the prototype dev info node, and setting a prototype name field of the prototype dev info node equal to a name field of the config entry, if the parent device dev info node is found in the device info tree.

16. The apparatus of claim 13, wherein the means for accessing a hardware configuration file for the device driver comprises:

means for searching a class file for at least one class entry corresponding to the class name, if the config entry specifies a class name;

means for searching a dev info tree for a parent dev info node corresponding to the class entry, for each class entry corresponding to the class name;

means for creating the prototype dev info node, and setting a prototype name field of the prototype dev info node equal to a name field of the config entry, for each class entry corresponding to the class name, if the parent dev info node is found in the dev info tree.

17. The apparatus of claim 16, wherein each class entry in the class file comprises a driver name portion, and a device class portion.

18. The apparatus of claim 17, wherein the means for searching a dev info tree comprises means for searching the dev info tree for a parent dev info node corresponding to the driver name portion of the class entry.

19. The apparatus of claim 13, wherein the means for generating the device names comprises:

means for generating a device name for the child device using a parent device driver for the possible parent device, for each prototype dev info node;

means for generating leaf nodes for the child device using a child device driver for the child device, for each prototype dev info node.

20. The apparatus of claim 19, wherein the means for generating a device name for the child device comprises:

means for loading the parent device driver corresponding to the possible parent device;

means for invoking a bus control operation of the parent device driver, the bus control operation causing the parent device driver to generate a device name for the child device;

means for deleting the prototype dev info node, if the parent device driver signals failure to generate a device name.

21. The apparatus of claim 19, wherein the means for generating leaf nodes for the child device comprises:

means for loading the child device driver corresponding to the child device;

means for invoking a probe and attach operation of the child device driver, the probe and attach operation causing the child device driver to sense at least one leaf device coupled to the child device, and to generate a minor data node for each leaf device;

means for deleting the prototype dev info node, if the child device driver probe and attach operation fails;

means for creating a special inode for each leaf device.

22. The apparatus of claim 12, wherein the means for determining a hierarchy of the devices comprises:

means for creating a dev info node for a root node of the hierarchy using the corresponding root node device driver;

means for determining child nodes of the root node using the root node device driver;

means for creating a dev info node for each child node;

means for determining a device driver corresponding to each child node according to a name of the child node.

23. An apparatus for generating device names accessible by a user, the device names indicating a physical arrangement of devices in a computer system, comprising:

first circuitry for determining a hierarchy of the devices according to the physical arrangement of the devices in the computer system, and determining a device driver for each device in the hierarchy;

a first mechanism coupled to said first circuitry for generating a device name for each device in the hierarchy;

second circuitry for creating at least one non-leaf node in the hierarchy for each device in the hierarchy that is a non-leaf device, said non-leaf node being accessible by a user, said non-leaf node containing a pointer to a non-leaf node of a parent of the non-leaf device;

a second mechanism, coupled to said second circuitry, for creating at least one device inode for each leaf device in the hierarchy, said device inode being accessible by the user, said device inode containing a pointer to a non-leaf node of the parent of the leaf device;

a third mechanism, coupled to said second circuitry, configured to, each device in the hierarchy, execute the device driver to generate minor node data and leaf device names; and a fourth mechanism, coupled to said third mechanism configured to create an additional inode accessible by the user for each additional minor node if the minor node data specifies additional minor nodes, the additional inodes having the leaf device names.

24. An apparatus for generating device names accessible by a user, the device names indicating a physical arrangement of devices in a computer system, comprising:

first circuitry for determining a hierarchy of the devices according to the physical arrangement of the devices in the computer system, and determining a device driver for each device in the hierarchy, said first circuitry comprising;

a first submechanism for creating a der info node for a root node of the hierarchy using a corresponding root node device driver;

a second submechanism coupled to said first submechanism adapted to determine child nodes of said root node using said root node device driver and to create a dev info node for each of said child nodes; and a third submechanism coupled to said second submechanism adapted to determine a device driver corresponding to each of said child nodes;

a first mechanism coupled to said first circuitry for generating a device name for each device in the hierarchy;

second circuitry for creating at least one non-leaf node in the hierarchy for each device in the hierarchy that is a non-leaf device, said non-leaf node being accessible by a user, said non-leaf node containing a pointer to a non-leaf node of a parent of the non-leaf device; and a second mechanism, coupled to said second circuitry, for creating at least one device inode for each leaf device in the hierarchy, said device inode being accessible by the user, said device inode containing a pointer to a non-leaf node of the parent of the leaf device.

* * * * *